Patented Nov. 28, 1944

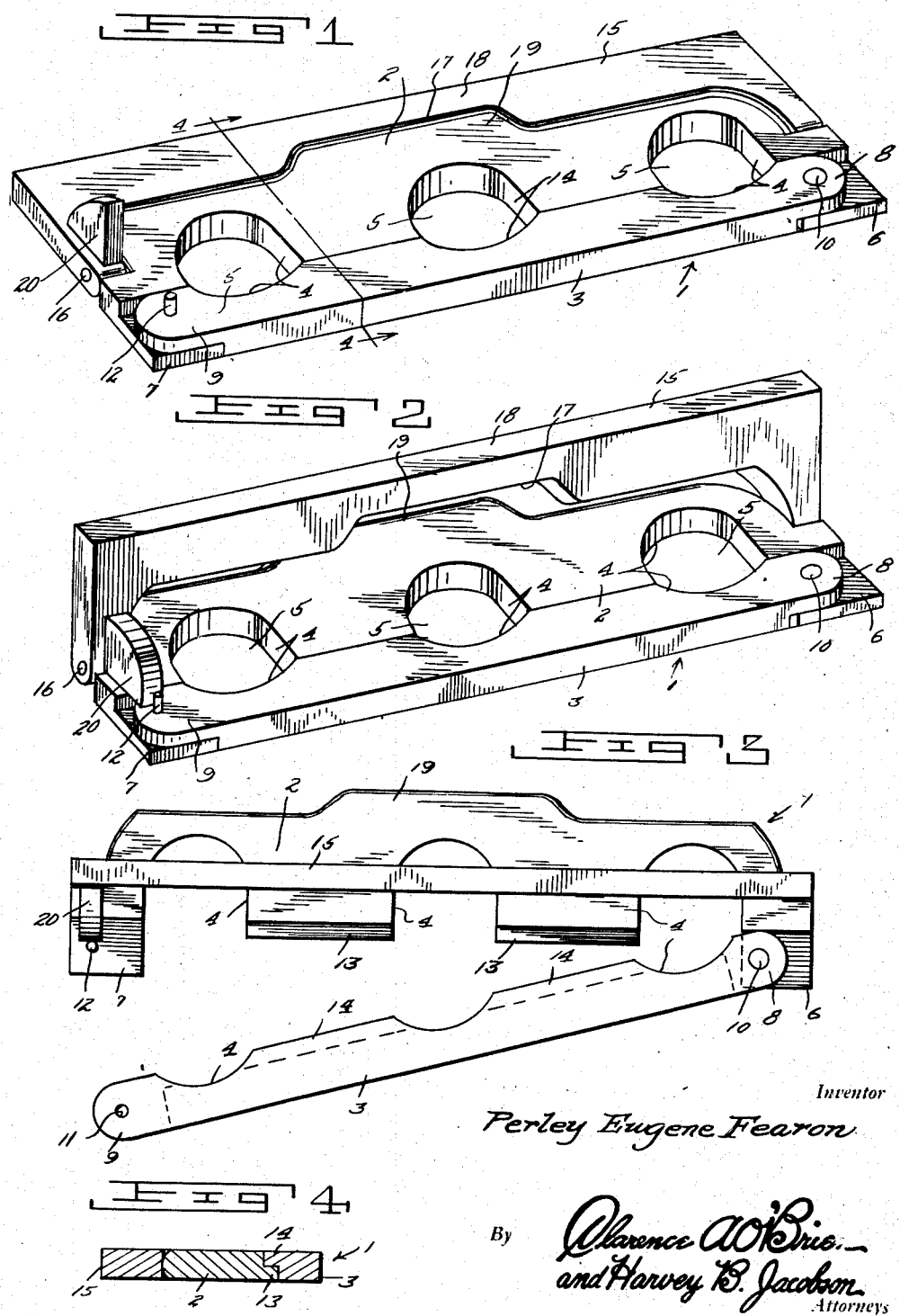

2,363,950

UNITED STATES PATENT OFFICE 2,363,950

MILK BOTTLE CARRIER

Perley Eugene Fearon, Canaan, Vt.

Application December 4, 1942, Serial No. 467,879

2 Claims. (Cl. 224—45)

The present invention relates to new and useful improvements in milk bottle carriers, and has for its primary object to provide, in a manner as hereinafter set forth, a substantially non-metallic device of this character comprising a novel construction and arrangement whereby a plurality of bottles may be conveniently picked up and carried with one hand.

Another very important object of the invention is to provide a carrier of the aforementioned character which embodies unique means for automatically locking the device when the bottles are suspended therein.

Still another very important object of the invention is to provide a milk bottle carrier of the character described which, when not in use, will occupy a minimum of space.

Other objects of the invention are to provide a milk bottle carrier which will be comparatively simple in construction, strong, durable, highly efficient and reliable in use, light in weight, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a perspective view of a milk bottle carrier constructed in accordance with the present invention, showing the handle folded.

Figure 2 is a perspective view of the device with the handle or bail in carrying position.

Figure 3 is a top plan view of the device with the pivoted bar in open position.

Figure 4 is a cross sectional view on a reduced scale, taken substantially on the line 4—4 of Figure 1.

Referring now to the drawing in detail, it will be seen that the embodiment of the invention which has been illustrated comprises an elongated frame of suitable material, preferably plywood, which is designated generally by reference numeral 1. The frame 1 includes stationary and pivoted bars 2 and 3, respectively. The bars 2 and 3 have formed, at longitudinally spaced points in their inner edges, opposed, complemental recesses or notches 4 defining, in conjunction with each other and when said bar 3 is in closed position, a series of openings 5 for the reception of the necks of a plurality of milk bottles.

The stationary bar 2 is formed to provide laterally projecting flanges 6 and 7 of reduced thickness on the inner longitudinal edge of its end portions. The bar 3 comprises longitudinally projecting end portions 8 and 9 of reduced thickness, the former being pivotally secured, as at 10, on the flange 6. The portion 9 of the bar 3 has formed therein an opening 11 for the reception of a pin 12 on the flange 7 for releasably securing said bar 3 in closed position. Tongues 13 project from the lower portion of the stationary bar 2 at points between the recesses 4 on the inner longitudinal edge of said bar. As best seen in Figure 4 of the drawing, the tongues 13 are engageable beneath complemental tongues 14 on the inner longitudinal edge of the swinging bar 3 in a manner to provide positive supports for said bar 3 at intermediate points.

A bail 15, also preferably of plywood, is pivotally secured, as at 16, to the ends of the bar 2. The inner or lower edge of the bail 15 has formed therein, at an intermediate point, an elongated recess or cut-out 17 providing a hand grip 18. The cut-out 17 accommodates a correspondingly shaped lateral protrusion 19 on the outer longitudinal edge of the stationary bar 2 when the bail 15 is in folded or inoperative position. The protrusion 19 strengthens the intermediate portion of the bar 2.

Projecting laterally from one end portion of the bail 15 is a substantially segmental lug 20. The lug 20 is engageable with the portion 9 of the swinging bar 3 for positively preventing disengagement of said bar from the pin 12 when the bail 15 is in carrying position.

It is thought that the manner of using the device will be readily apparent from a consideration to the foregoing. Briefly, to load the carrier, the bail 15 is swung downwardly to folded position. The free end portion of the pivoted bar 3 is then raised sufficiently to clear the pin 12 and said bar is then swung to open position on its pivot 10. The necks of the milk bottles are then engaged in the recesses 4 in the bar 2. The swinging bar 3 is then closed on the bottles and again engaged with the pin 12. The bail 15 is then swung upwardly to carrying position, as seen in Figure 2 of the drawing, and the bottles may now be lifted. Of course, the bottles are suspended from the frame 1 when the carrier is lifted. The lug 20, as hereinbefore mentioned, automatically secures the bar 3 in engagement with the pin 12 when the bail 15 is raised to carrying position. The recess 17 in the bail 15 permits the hand on the grip 18 to clear the top of the intermediate bottle. Of course, to remove the bottles the handle 15 is again swung downwardly to folded position thereby disengaging the locking lug 20 from the bar 3 for permitting said bar to be swung to open position.

It is believed that the many advantages of a milk bottle carrier constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A milk bottle carrier comprising two horizontal plate-like bars, one of said bars having laterally projecting flanges on the inner longitudinal edges of its end portions, the other bar having end portions of reduced thickness, one of the latter end portions being pivoted on one of said flanges to provide for swinging of said other bar toward or away from said one bar, the other of said end portions being positionable upon the other flange when said other bar is swung to a closed position against said one bar, said other end portion having an opening, said other flange having an upstanding pin arranged to enter said opening to releasably secure said other bar in closed position, said bars having a plurality of opposed complemental notches in their inner edges forming a series of openings for retaining reception of the necks of a plurality of bottles when said other bar is in closed position, the ends of said one bar having notches, and a bail pivoted at its ends to the ends of said one bar within said notches.

2. A milk bottle carrier comprising two horizontal plate-like bars, one of said bars having laterally projecting flanges on the inner longitudinal edges of its end portions, the other bar having end portions of reduced thickness, one of the latter end portions being pivoted on one of said flanges to provide for swinging of said other bar toward or away from said one bar, the other of said end portions being positionable upon the other flange when said other bar is swung to a closed position against said one bar, connecting means to releasably connect said other end portion to said other flange when said other bar is in closed position, said bars having a plurality of opposed complemental notches in their inner edges forming a series of openings for retaining reception of the necks of a plurality of bottles when said other bar is in closed position, and a bail pivoted at its ends to the ends of said one bar, said bail having a laterally projecting lug rigid with one end thereof and swinging into engagement with the upper surface of said other end of said other bar when the bail is swung upwardly to a vertical position, for preventing release of said connecting means.

PERLEY EUGENE FEARON.